United States Patent
Wang

(10) Patent No.: US 10,378,568 B2
(45) Date of Patent: Aug. 13, 2019

(54) LATERAL POSITIONING DEVICE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC. (TW)

( * ) Notice: Subject to any disclaimer, the term of this patent is extended or adjusted under 35 U.S.C. 154(b) by 231 days.

(21) Appl. No.: 15/197,986

(22) Filed: Jun. 30, 2016

(65) Prior Publication Data
US 2017/0002849 A1    Jan. 5, 2017

(30) Foreign Application Priority Data
Jul. 3, 2015 (TW) .............................. 104210851 U

(51) Int. Cl.
| | |
|---|---|
| *F16B 5/00* | (2006.01) |
| *F16B 5/02* | (2006.01) |
| *F16B 41/00* | (2006.01) |
| *F16B 1/00* | (2006.01) |

(52) U.S. Cl.
CPC .......... F16B 5/0266 (2013.01); F16B 41/002 (2013.01); *F16B 1/0071* (2013.01)

(58) Field of Classification Search
CPC .... F16B 41/002; F16B 5/0208; F16B 5/0266; F16B 5/06; F16B 5/0621; F16B 21/08; F16B 21/06; F16B 1/0071
USPC .................................................. 411/999, 347
See application file for complete search history.

(56) References Cited

U.S. PATENT DOCUMENTS

| | | | | | |
|---|---|---|---|---|---|
| 295,583 | A | * | 3/1884 | Pfenning ................. | F16B 21/06 24/613 |
| 748,078 | A | * | 12/1903 | Kaisling ................... | E05C 5/04 292/251 |
| 1,454,890 | A | * | 5/1923 | Harpe ..................... | F16B 21/06 24/613 |
| 1,485,990 | A | * | 3/1924 | Moore .................... | F16B 21/06 24/580.1 |
| 2,018,346 | A | * | 10/1935 | Busby ...................... | E05C 5/04 292/251 |
| 2,831,520 | A | * | 4/1958 | Clarke .................. | F16B 41/002 292/251 |
| 2,919,097 | A | * | 12/1959 | Bohlman ............. | A47C 21/022 248/222.14 |

(Continued)

*Primary Examiner* — Flemming Saether
(74) *Attorney, Agent, or Firm* — Schmeiser, Olsen & Watts, LLP

(57) ABSTRACT

A lateral positioning device coupled to a first object to laterally engage or interfere with a second object. The lateral positioning device includes a body portion and positioning element. The body portion is coupled to the first object in a first direction and has a through hole which has therein a limiting portion and extends in a second direction, with an angle formed between the first and second directions. The positioning element is penetratingly disposed in the through hole and limited by the limiting portion to thereby move in the second direction. The positioning element has an engaging portion disposed on the first side of the limiting portion to allow the engaging portion to engage with the second object; a stopping portion disposed on the second side of the limiting portion; and a neck portion connecting with the engaging and stopping portions and passing through the limiting portion.

4 Claims, 21 Drawing Sheets

(56) References Cited

U.S. PATENT DOCUMENTS

| | | | | |
|---|---|---|---|---|
| 3,118,696 | A * | 1/1964 | Resare | B25B 23/0035 |
| | | | | 403/328 |
| 3,378,806 | A * | 4/1968 | Wilkerson | H01R 4/302 |
| | | | | 411/337 |
| 3,597,110 | A * | 8/1971 | Corsmeier | F01D 5/066 |
| | | | | 416/198 R |
| 5,704,661 | A * | 1/1998 | Takimoto | E05B 65/0864 |
| | | | | 292/162 |
| 6,095,736 | A * | 8/2000 | Miller | F16B 41/002 |
| | | | | 411/107 |
| 7,967,538 | B1 * | 6/2011 | Coope | F16B 41/002 |
| | | | | 411/348 |
| 8,634,203 | B2 * | 1/2014 | Yu | F16B 5/0016 |
| | | | | 361/785 |
| 2012/0099943 | A1 * | 4/2012 | Chiu | F16B 5/0208 |
| | | | | 411/347 |
| 2013/0279973 | A1 * | 10/2013 | Li | H05K 7/02 |
| | | | | 403/327 |
| 2017/0009790 | A1 * | 1/2017 | Wang | F16B 5/065 |

* cited by examiner

LATERAL POSITIONING DEVICE

CROSS-REFERENCE TO RELATED APPLICATION

This non-provisional application claims priority under 35 U.S.C. § 119(a) on patent application Ser. No.(s). 104210851 filed in Taiwan, R.O.C. on Jul. 3, 2015, the entire contents of which are hereby incorporated by reference.

FIELD OF THE INVENTION

The present invention relates to lateral positioning devices and, more particularly, to a lateral positioning device coupled to a first object and engaged, quickly as well as laterally, with a second object.

BACKGROUND OF THE INVENTION

According to the prior art, two parallel plates can be connected by a fixedly connecting component. The fixedly connecting component usually operates by screwing and comprises a screw and a sleeve. One end of the screw has a driven portion that comes with a drive. The other end of the screw has a threaded portion connected to the driven portion. The sleeve fits around the threaded portion of the screw so that the screw can move within the sleeve. Therefore, the fixedly connecting component operates in a manner described below. One end of the sleeve gets coupled to a first object (such as a circuit board), whereas the threaded portion of the screw penetrates one end of the sleeve and corresponds in position to a locking hole of a second object (such as a chassis or a casing), and then a tool exerts a rotational force on the drive of the driven portion of the screw to fasten the threaded portion to the locking hole of the second object, thereby connecting the parallel first and second objects.

However, the fixedly connecting component fails to connect, screw together, or engage two objects which are perpendicular to each other, for example, in the situation where the first object is fixed in place on a plane which extends in direction X, whereas the second object is fixed in place on a plane which extends in direction Y, wherein direction Y is perpendicular to direction X. Therefore, it is important to provide a positioning-engaging device for connecting two objects which are perpendicular to each other and enabling the two objects to be quickly connected and separated by pressing, engagement or twisting without a tool.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a lateral positioning device as disclosed in the present invention to quickly connect two non-parallel objects, and achieve structural simplicity, so as to render operation quick and convenient.

In order to achieve the above and other objectives, the present invention provides a lateral positioning device, comprising: a body portion adapted to be coupled to a first object in a first direction and having a through hole which has therein a limiting portion and extends in a second direction, with an angle formed between the first direction and the second direction; and a positioning element penetratingly disposed in the through hole and limited by the limiting portion to thereby move in the second direction, wherein the positioning element has an engaging portion for engaging or interfering with a corresponding object.

Regarding the lateral positioning device, the body portion is a post, a cylinder, a rod, a block, a plate, a hollowed-out structure, a bent structure, a polyhedral structure, an irregularly shaped solid structure, a handle structure or a latch structure.

Regarding the lateral positioning device, the body portion has a shoulder for abutting against the first object.

Regarding the lateral positioning device, the body portion has a jointing portion adapted to be coupled to the first object in the first direction through a post-connecting structure, a riveting structure, a screwing structure, an expanding structure, a welding structure, a snap-engaging structure, an adhering structure, a magnetically attracting structure or an integrally formed structure.

Regarding the lateral positioning device, the engaging portion of the positioning element is disposed on a first side of the limiting portion, wherein the positioning element has a stopping portion and a neck portion, with the stopping portion disposed on a second side of the limiting portion, and the neck portion connected to the engaging portion and the stopping portion and adapted to pass through the limiting portion.

Regarding the lateral positioning device, an angle of 30°~150° is formed between the first direction and the second direction.

Regarding the lateral positioning device, the engaging portion of the positioning element is a post, a threaded structure, a female engaging structure, a resiliently engaging structure, a spherical structure, a male engaging structure, an arcuate-surfaced structure or an oblique-surfaced structure.

Regarding the lateral positioning device, the stopping portion is disposed inside or outside the through hole.

Regarding the lateral positioning device, at least one of the first side and the second side of the limiting portion of the through hole forms a retraction space, and the engaging portion or the stopping portion of the positioning element is received or moves within in the retraction space.

The lateral positioning device further comprises a resilient element with an end abutting against the engaging portion and another end abutting against the limiting portion or the body portion, or with an end abutting against the stopping portion and another end abutting against the limiting portion or the body portion, thereby allowing the engaging portion to engage or interfere with the corresponding object resiliently.

Regarding the lateral positioning device, two limiting portions are disposed on an inner wall of the through hole or disposed at openings at two ends of the through hole, respectively, and the stopping portion is received in the through hole between the limiting portions.

The lateral positioning device further comprises a resilient element with an end abutting against the body portion or any one of the limiting portions and another end abutting against the stopping portion.

Regarding the lateral positioning device, the resilient element is a helical spring, a resilient post or a leaf spring.

The lateral positioning device and the first object are mounted together or form integrally a module.

Regarding the lateral positioning device, the retraction space is a cylindrical space, a hexahedral space, a conical space, an arcuate space, a stepped space, a chamber-style space, an open chamber-style space, a recess, an L-shaped chamber or a one-sided chamber.

Regarding the lateral positioning device, the positioning element has at one end thereof an operating portion.

Regarding the lateral positioning device, the operating portion has a color layer, and the color layer is made of plastic, rubber, silica gel, lacquer, baking varnish or electroplated layer.

Regarding the lateral positioning device, the through hole is a cylindrical space, a hexahedral space, a conical space, an arcuate space, a stepped space, a chamber-style space, an open chamber-style space, a recess, an L-shaped chamber or a one-sided chamber.

Regarding the lateral positioning device, the body portion is adapted to be coupled to the first object in the first direction through a sleeve movably disposed at the body portion.

In order to achieve the above and other objectives, the present invention provides a lateral positioning device, comprising: a body portion adapted to be coupled to a first object in a first direction and having a chamber portion which has therein a limiting portion and extends in a second direction, with an angle formed between the first direction and the second direction; and a movement element penetratingly disposed in the chamber portion and limited by the limiting portion to thereby move in the second direction.

Regarding the lateral positioning device, one end of the movement element has an engaging portion, and the engaging portion engages or interferes with a corresponding object.

Regarding the lateral positioning device, one end of the movement element has an operating portion.

Regarding the lateral positioning device, the operating portion is disposed inside or outside the chamber portion.

Regarding the lateral positioning device, the operating portion is a post-shaped, sheet-shaped, convex, concave, arcuate, spherical, taper, handle-shaped or movable board.

Regarding the lateral positioning device, the movement element has a movement opening, and the limiting portion is confined to the movement opening.

Regarding the lateral positioning device, the limiting portion is a penetratingly disposing element, and the penetratingly disposing element is movably penetratingly disposed or fixedly penetratingly disposed in the movement opening.

Regarding the lateral positioning device, the movement opening is a through hole, a recess, an oblong slot or an oblong hole.

Regarding the lateral positioning device, the movement element moves within a movement limiting space of the movement opening.

Regarding the lateral positioning device, the body portion has a body portion opening, and the limiting portion is confined to the body portion opening.

Regarding the lateral positioning device, the limiting portion is a penetratingly disposing element, and the penetratingly disposing element is movably penetratingly disposed or fixedly penetratingly disposed in the body portion opening.

Regarding the lateral positioning device, the body portion opening is a through hole, a recess, an oblong slot or an oblong hole.

Regarding the lateral positioning device, the movement element moves within a movement limiting space of the body portion opening.

Regarding the lateral positioning device, the penetratingly disposing element is integrally formed of a post, an engaging structure or a plate and a body portion or a movement element.

The lateral positioning device further comprises a resilient element which abuts against the movement element and the limiting portion or the body portion.

Regarding the lateral positioning device, the chamber portion is a through hole, a recess, an L-shaped chamber or a one-sided chamber.

Regarding the lateral positioning device, the body portion or the movement element is made of a plastic or a metal.

Regarding the lateral positioning device, the lateral positioning device and the first object together form a module.

The lateral positioning device comprises a carrier for carrying the lateral positioning device.

Regarding the lateral positioning device, the carrier is a feed pan or a feed belt.

Regarding the lateral positioning device, the carrier has a lid for covering the lateral positioning device.

Regarding the lateral positioning device, the first object is made of a printed circuit board (PCB) plastic or a metal.

Therefore, the lateral positioning device of the present invention is characterized in that: the body portion is coupled to the first object in the first direction X, and the positioning element faces the second direction Y to squarely engage or laterally interfere with the second object, thereby connecting the first object and the second object laterally and quickly.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
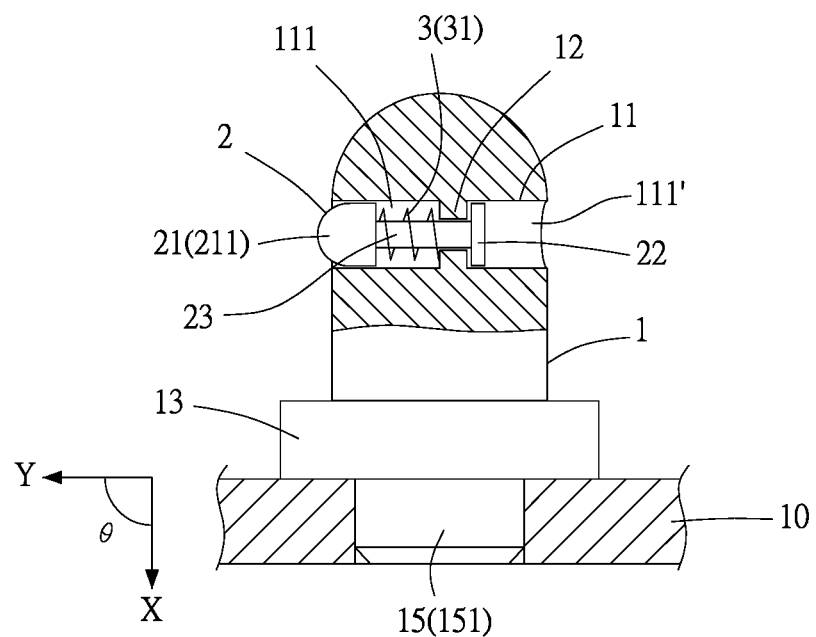
FIG. 1 is a cross-sectional schematic view of a lateral positioning device according to the first preferred embodiment of the present invention.

Referring to FIG. 1, FIG. 2, FIG. 6 and FIG. 7, the lateral positioning device of the present invention is adapted to be coupled to a first object 10 (such as a casing, a chassis, a board or a circuit board) and laterally or obliquely engaged with a second object 20 (such as any other casing, chassis, board or circuit board). In a preferred embodiment of the present invention, the lateral positioning device essentially comprises a body portion 1 and a positioning element 2 movable within the body portion 1. The body portion 1 is provided in the form of a post (a rod), a cylinder, a rod, a block, a plate (shown in FIG. 6 and FIG. 7), a hollowed-out structure, a bent structure, a polyhedral structure, an irregularly shaped solid structure, a handle structure or a latch structure. The body portion 1 is coupled to the first object 10 in a first direction X. The body portion 1 has at least one through hole 11 which extends in a second direction Y. The through hole 11 has therein a limiting portion 12. The limiting portion 12 is a radially limiting raised portion integrally formed or mounted at one end, or the middle, of the inner wall of the through hole 11. An angle θ is formed between the first direction X and the second direction Y. The angle θ is 30°~150°, preferably 90°. The positioning element 1 is penetratingly disposed in the through hole 11 of the body portion 1 and axially or radially limited by the limiting portion 12 to allow the positioning element 1 to move in the second direction Y of the through hole 11. Preferably, the positioning element 2 has an engaging portion 21, a stopping portion 22, and a neck portion 23. The engaging portion 21 is disposed on a first side of the limiting portion 12. The engaging portion 21 has a larger diameter than the limiting portion 12. With the positioning element 2 being movable, the engaging portion 21 squarely engages (shown in FIG. 8) or laterally interferes (shown in FIG. 3 and FIG. 4) with the second object 20. The stopping portion 22 is disposed on a second side of the limiting portion 12. The stopping portion 22 has a larger diameter than the limiting portion 12 so as to be stopped at the limiting portion 12, thereby preventing the positioning element 2 from separating from the through hole 11. The neck portion 23 is integrally formed or mounted to be connected between the engaging portion 21 and the stopping portion 22 and passed through the limiting portion 12.

Figure 3:
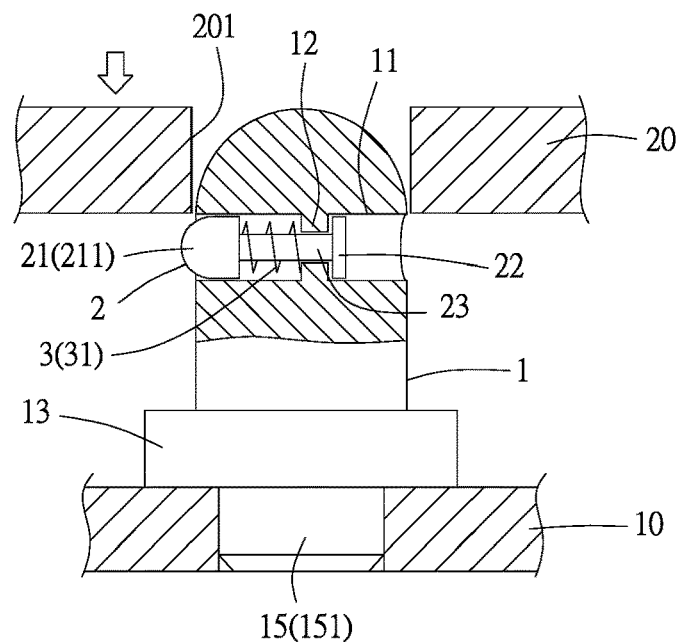
FIG. 3 is a cross-sectional schematic view of lateral interference operation of the lateral positioning device according to the first preferred embodiment of the present invention.
Figure 4:
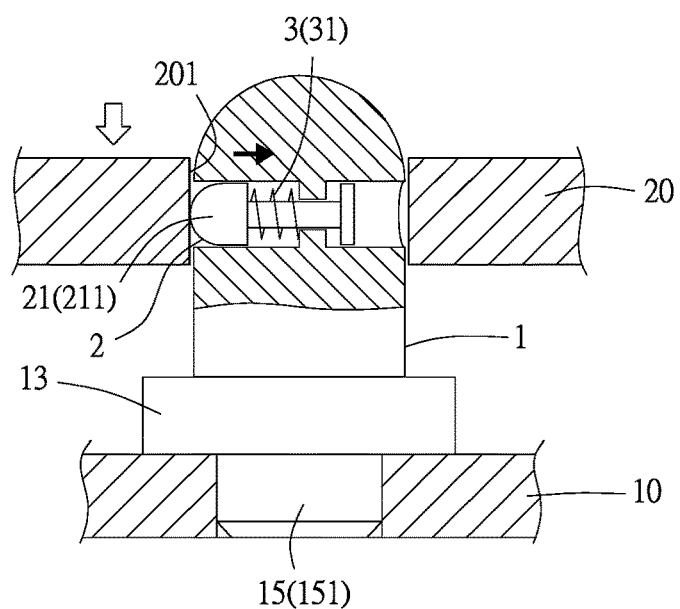
FIG. 4 is a cross-sectional schematic view of movement of a positioning element of the lateral positioning device according to the first preferred embodiment of the present invention.
Figure 5:
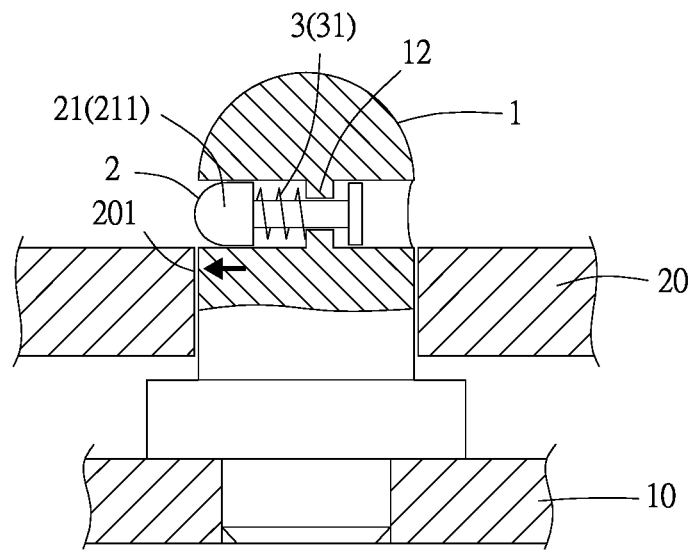
FIG. 5 is a cross-sectional schematic view of lateral interference state of the lateral positioning device according to the first preferred embodiment of the present invention.
Figure 6:
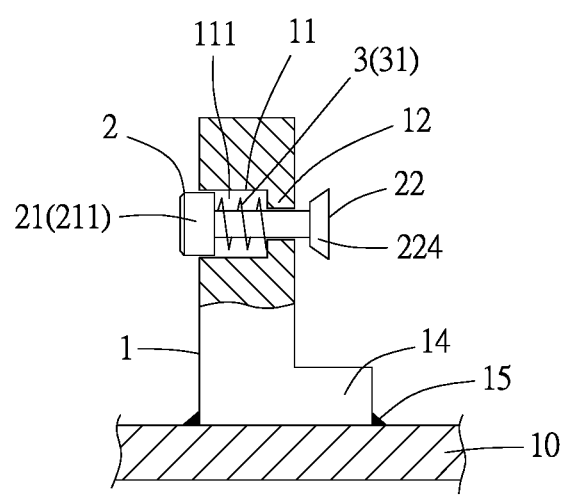
FIG. 6 is a cross-sectional schematic view of the lateral positioning device according to the second preferred embodiment of the present invention.
Figure 7:
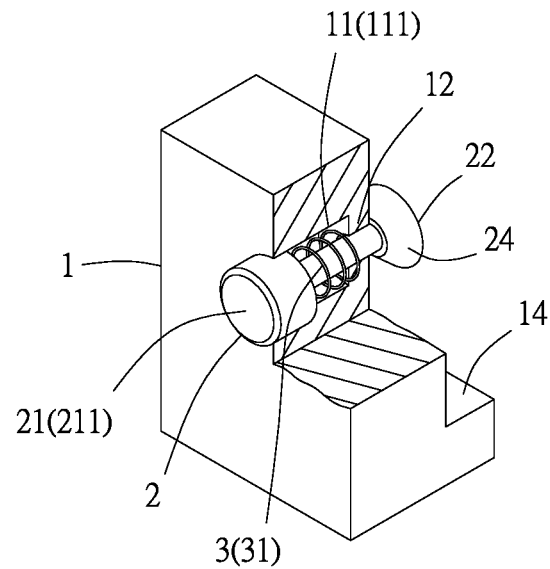
FIG. 7 is a cutaway view of the lateral positioning device according to the second preferred embodiment of the present invention.
Figure 8:
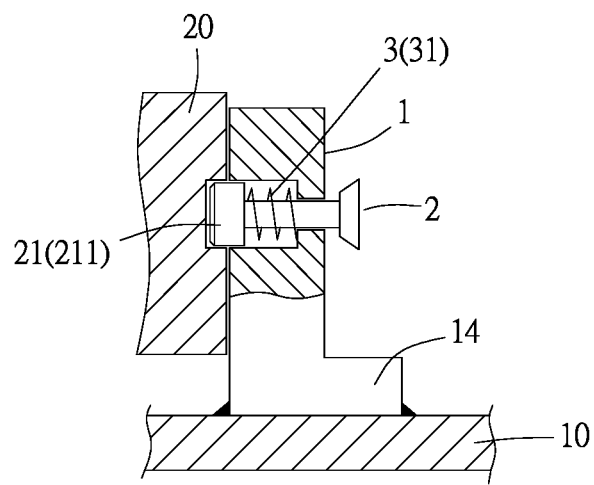
FIG. 8 is a cross-sectional schematic view of squarely engagement state of the lateral positioning device according to the second preferred embodiment of the present invention.
Figure 9:
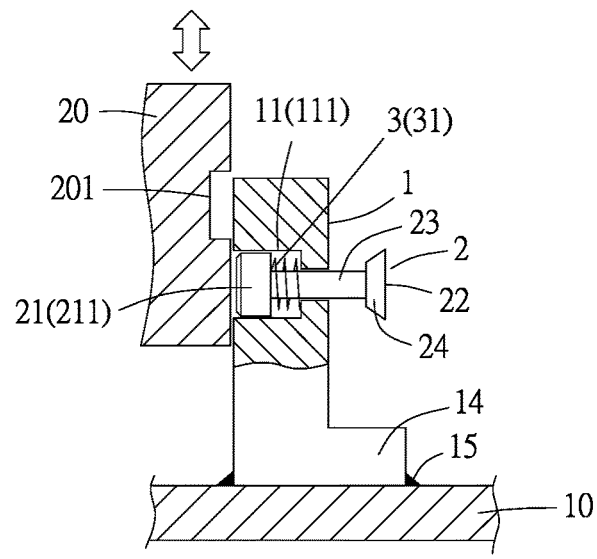
FIG. 9 is a cross-sectional schematic view of disengagement of the lateral positioning device according to the second preferred embodiment of the present invention.

Referring to FIG. 3 and FIG. 4, to start operating the lateral positioning device of the present invention, the body portion 1 penetrates a hole 201 of the second object 20 so that the hole 201 compresses the positioning element 2. As a result, the engaging portion 21 retracts into the through hole 11 of the body portion 1. It is only when the engaging portion 21 passes through the hole 201 of the second object 20 that a resilient element 3 causes the positioning element 2 to rebound, and therefore the engaging portion 21 laterally interferes and engages with one end/side of the hole 201, thereby allowing the first object 10 and the second object 20 to engage with each other quickly. Referring to FIG. 8 and FIG. 9, to start operating the lateral positioning device of the present invention, it is feasible not to allow the body portion 1 to penetrate the second object 20 but to allow the second object 20 to abut against the body portion 1 laterally, and therefore a resilient thrust from the resilient element 3 causes the engaging portion 21 of the positioning element 2 to squarely engage with the hole 202 of the second object 20.

Figure 2:
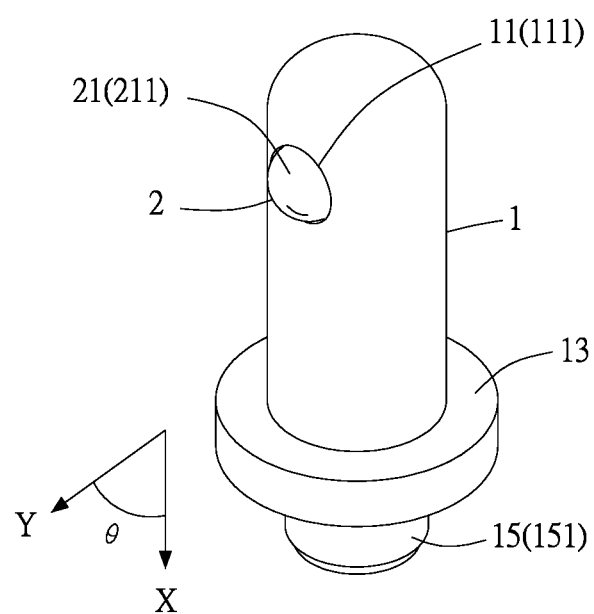
FIG. 2 is a perspective view of the lateral positioning device according to the first preferred embodiment of the present invention.

Referring to FIG. 1 and FIG. 2, in a preferred embodiment of the present invention, the body portion 1 has a shoulder 13 which abuts against the first object 10, or a base portion 14 is disposed on any one or two sides of the body portion 1 to abut against the first object 10 so that the body portion 1 is coupled to the first object 10 through the shoulder 13 or the base portion 14. Specifically speaking, the present invention is characterized in that a jointing portion 15 is disposed at any point on the shoulder 13 or the base portion 14 so that the jointing portion 15 is coupled to the first object 10 in the first direction X through a post-connecting structure 151 (shown in FIG. 1), a riveting structure 152 (shown in FIG. 10), a screwing structure, an expanding structure, a welding structure, a snap-engaging structure, an adhering structure, a magnetically attracting structure or an integrally formed structure; hence, the lateral positioning device of the present invention and the first object 10 together form a module which squarely engages or laterally interferes with the second object 20.

Figure 17:
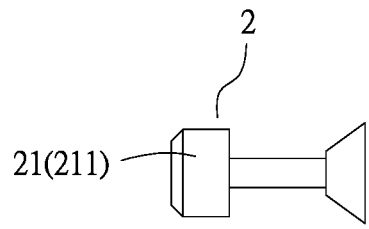
FIG. 17 is a schematic view which shows that an engaging portion of the positioning element is provided in the form of a post according to the present invention.
Figure 18:
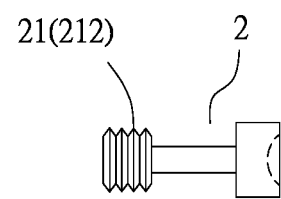
FIG. 18 is a schematic view which shows that the engaging portion of the positioning element is provided in the form of a threaded structure according to the present invention.
Figure 19:
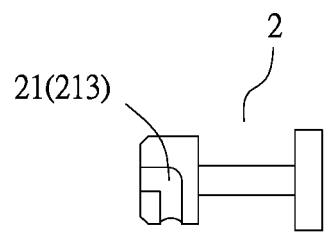
FIG. 19 is a schematic view which shows that the engaging portion of the positioning element is provided in the form of a female engaging structure according to the present invention.
Figure 20:
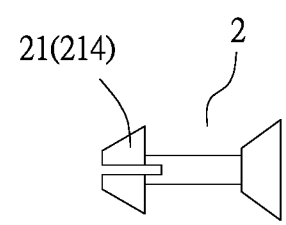
FIG. 20 is a schematic view which shows that the engaging portion of the positioning element is provided in the form of a resiliently engaging structure according to the present invention.
Figure 21:
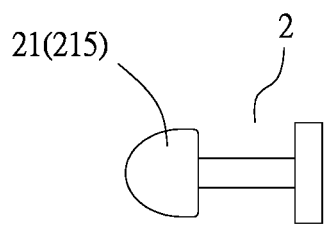
FIG. 21 is a schematic view which shows that the engaging portion of the positioning element is provided in the form of a spherical structure according to the present invention.
Figure 22:
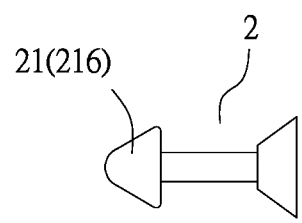
FIG. 22 is a schematic view which shows that the engaging portion of the positioning element is provided in the form of an arcuate-surfaced structure according to the present invention.

Through the engaging portion 21, the positioning element 2 squarely engages or laterally interferes with the second object 20. The engaging portion 21 is provided in the form of a post 211 (shown in FIG. 7, FIG. 8 and FIG. 17), a threaded structure 212 (shown in FIG. 10 and FIG. 18), a female engaging structure 213 (shown in FIG. 19), a resiliently engaging structure 214 (shown in FIG. 20), a spherical structure 215 (shown in FIG. 1 and FIG. 19), a male engaging structure, an arcuate-surfaced structure 216 (shown in FIG. 22) or an oblique-surfaced structure. The holes 201, 202 of the second object 20 come with the post 211, the threaded structure 212, the female engaging structure 213, the resiliently engaging structure 214, the spherical structure 215 or a male engaging structure and the arcuate-surfaced structure 216 so that the lateral positioning device of the present invention engages or interferes with the second object 20.

According to the present invention, the stopping portion 22 of the positioning element 2 is axially stopped at the limiting portion 12 of the through hole 11. The stopping portion 22 is disposed inside the through hole 11 (shown in FIG. 1 and FIG. 10) or outside the through hole 11 (shown in FIG. 7 and FIG. 8). An operating portion 24 is disposed on a lateral side or end surface of the stopping portion 22 so as to be easily pushed, pulled or twisted, and therefore the engaging portion 21 at the other end squarely engages or laterally interferes with the second object 20. The operating portion 24 has a color layer. The color layer is made of plastic, rubber, silica gel, lacquer, baking varnish or electroplated layer and serves a descriptive, indicative or distinctive purpose. The first side and/or the second side of the limiting portion 12 of the through hole 11 can form a retraction space 111, 111'. The retraction space 111, 111' (or the through hole 11) is provided in the form of a cylindrical space, a hexahedral space, a conical space, an arcuate space, a stepped space, a chamber-style space, an open chamber-style space, a recess, an L-shaped chamber or a one-sided chamber so that the engaging portion 21 or the stopping portion 22 of the positioning element 2 is received or moves within the retraction space 111, 111'.

Figure 12:
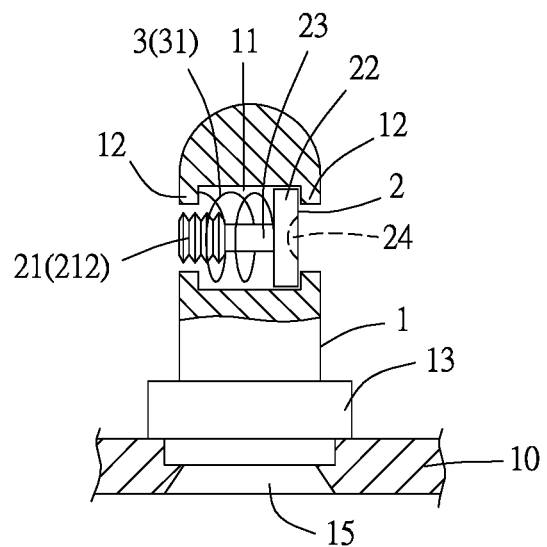
FIG. 12 is a cross-sectional schematic view of limiting portions disposed at two ends of a through hole, respectively, according to the present invention.

Referring to FIG. 12, according to the present invention, two limiting portions 24 are disposed on the inner wall of the through hole 11 of the body portion 1 or disposed at openings at two ends of the through hole 11 of the body portion 1, respectively, so that the positioning element 2 is received in the through hole 11 to allow the stopping portion 22 to be received between the limiting portions 24, thereby stopping the positioning element 2.

Figure 10:
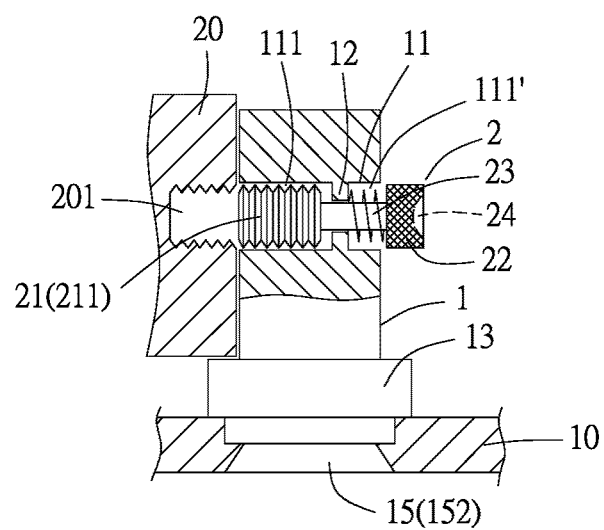
FIG. 10 is a cross-sectional schematic view of the lateral positioning device according to the third preferred embodiment of the present invention.
Figure 11:
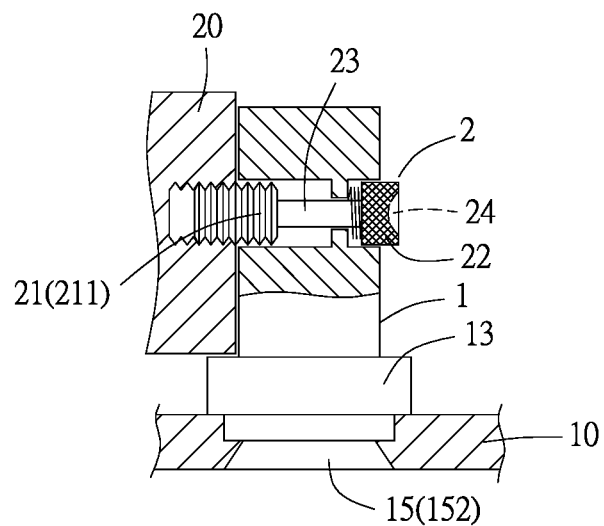
FIG. 11 is a cross-sectional schematic view of how the lateral positioning device is screwed to a second object according to the third preferred embodiment of the present invention.
Figure 14:
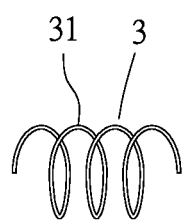
FIG. 14 is a schematic view of a resilient element provided in the form of a helical spring according to the present invention.
Figure 15:
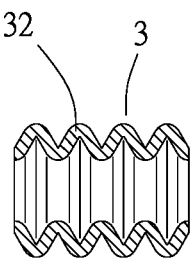
FIG. 15 is a schematic view of the resilient element provided in the form of a resilient post according to the present invention.
Figure 16:
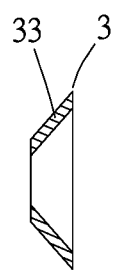
FIG. 16 is a schematic view of the resilient element provided in the form of a leaf spring according to the present invention.
Figure 13:
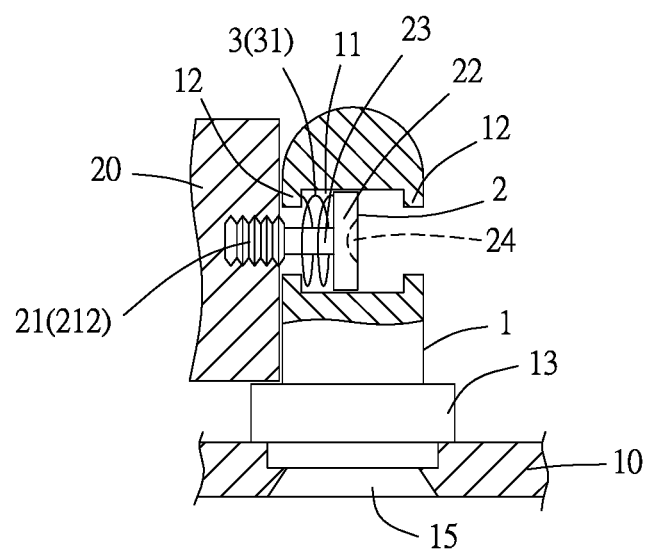
FIG. 13 is a cross-sectional schematic view of use of the limiting portions disposed at two ends of the through hole, respectively, according to the present invention.

In another preferred embodiment of the present invention, to enable or disable square engagement or lateral interference between the engaging portion 21 of the positioning element 2 and the holes 201, 202 of the second object 20, the resilient element 3 is disposed in the retraction space 111 on the first side of the limiting portion 12 to allow one end of the resilient element 3 to abut against the engaging portion 21 and allow the other end of the resilient element 3 to abut against the limiting portion 12 (shown in FIG. 1, FIG. 6 and FIG. 7) (or the body portion 1), thereby assisting the engaging portion 21 in squarely engaging or laterally interfering with the holes 201, 202 of the second object 20. Alternatively, the resilient element 3 is disposed in the retraction space 111' on the first side of the limiting portion 12 to allow one end of the resilient element 3 to abut against the stopping portion 22 and allow the other end of the resilient element 3 to abut against the limiting portion 12 (or the body portion 1), thereby disabling the square engagement or lateral interference between the engaging portion 21 and the second object 20 (as shown in FIG. 10). Referring to FIG. 13, the resilient element 3 is disposed in the through hole 11 to allow one end of the resilient element 3 to abut against the body portion 1 or any one of the limiting portions 24 and allow the other end of the resilient element 3 to abut against the stopping portion 22. Preferably, the resilient element 3 is provided in the form of a helical spring 31 (shown in FIG. 1 and FIG. 14), a resilient post 32 (shown in FIG. 15) or a leaf spring 33 (shown in FIG. 16).

Figure 23:
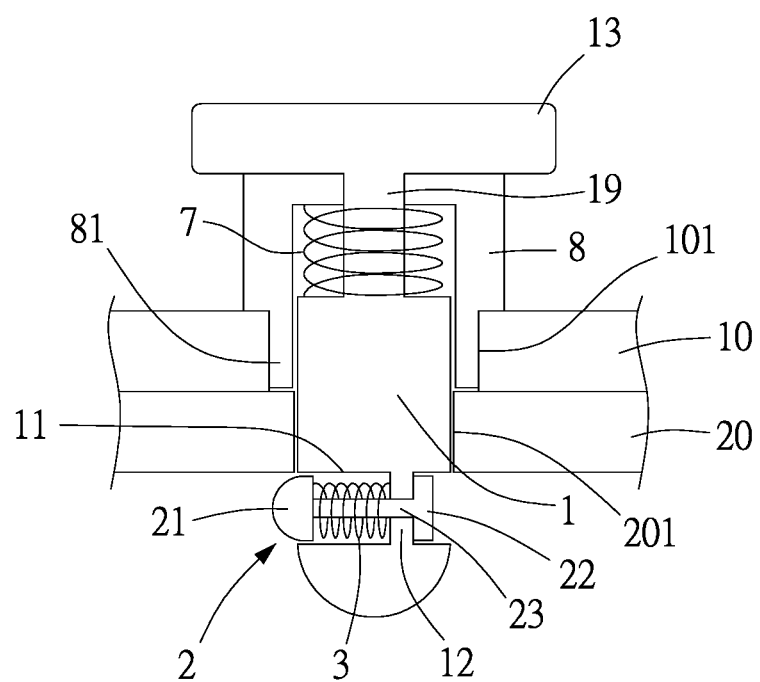
FIG. 23 is a cross-sectional schematic view of the lateral positioning device according to the fourth preferred embodiment of the present invention.

Referring to FIG. 23, the body portion 1 is adapted to be coupled to the first object 10 in the first direction through a sleeve 8. The sleeve 8 has a jointing portion 81 which is coupled to a fixing hole 101 of the first object 10. The sleeve 8 is movably disposed at the body portion 1. The sleeve 8 movably fits around a neck portion 19 of the body portion 1 so that the sleeve 8 is confined to between the shoulder 13 and the body portion 1. A resilient element 7 is disposed between the sleeve 8 and the body portion 1 to allow the sleeve 8 to move resiliently relative to the body portion 1.

Referring to FIG. 24, FIG. 25, FIG. 26, FIG. 27, FIG. 44 and FIG. 45, in the fifth preferred embodiment of the present invention, the lateral positioning device essentially comprises a body portion 1 and a movement element 4. The body portion 1 is made of a plastic or a metal. The body portion 1 is adapted to be coupled to the first object 10 in the first direction X. The body portion 1 has at least one chamber portion 16 which extends in the second direction Y. An angle θ is formed between the first direction X and the second direction Y. The angle θ is preferably 15° to 165°. The chamber portion 16 is a through hole, a recess, an L-shaped chamber or a one-sided chamber. Likewise, the chamber portion 16 has therein a limiting portion 12. The movement element 4 is penetratingly disposed in the chamber portion 16. The movement element 4 is limited by the limiting portion 12 and thereby moves in the second direction Y. The movement element 4 engages or interferes with a second object 20. The first object 10 and the second object 20 are made of a plastic or a metal and are each a board, a block, a post or a structure of any other shape which is made of any other material.

Figure 38:
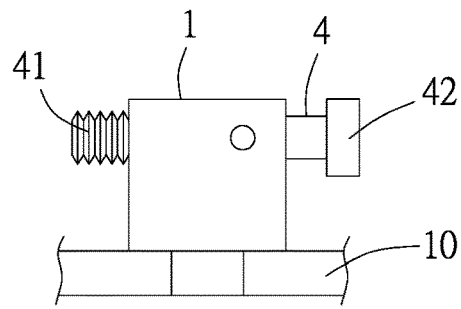
FIG. 38 is a schematic view which shows that the engaging portion of the movement element is a threaded structure.
Figure 39:
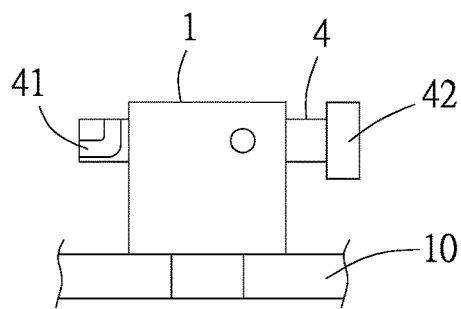
FIG. 39 is a schematic view which shows that the engaging portion of the movement element is a female engaging structure.
Figure 40:
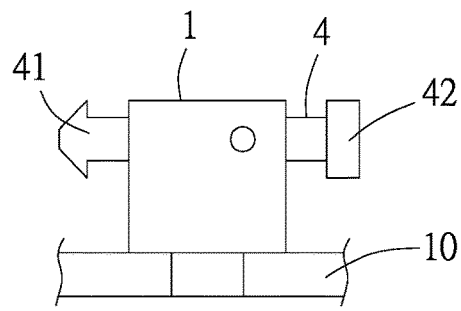
FIG. 40 is a schematic view which shows that the engaging portion of the movement element is a male engaging structure.

Referring to FIG. 24 through FIG. 27, the movement element 4 has at one end thereof an engaging portion 41. The engaging portion 41 engages or interferes with the second object 20. The engaging portion 41 is a post (shown in FIG. 24), an oblique-surfaced structure (shown in FIG. 26 and FIG. 44), a threaded structure (shown in FIG. 38), a female engaging structure (shown in FIG. 39), a resiliently engaging structure, a spherical structure, a male engaging structure (shown in FIG. 40) or an arcuate-surfaced structure and engages or interferes with the second object 20 structurally corresponding to the engaging portion 41. The movement element 4 has at the other end thereof an operating portion 42 for moving the movement element 4. The operating portion 42 is disposed inside or outside the chamber portion 16. The operating portion 42 is provided in the form of a post-shaped, sheet-shaped, convex, concave, arcuate, spherical, taper, handle-shaped or movable board (shown in FIG. 34 to FIG. 37). The operating portion 42 has a color layer. The color layer is made of plastic, rubber, silica gel, lacquer, baking varnish or electroplated layer.

Figure 24:
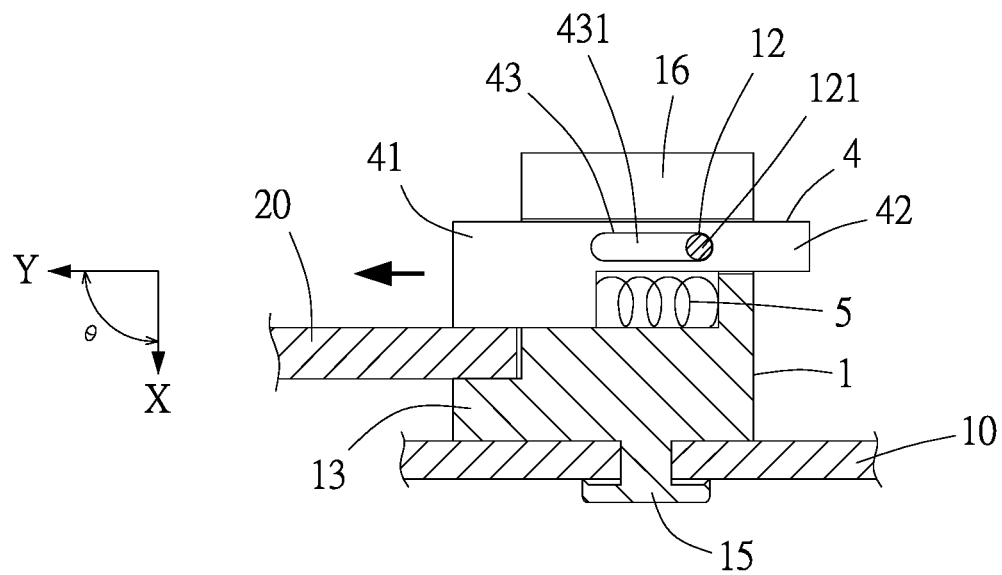
FIG. 24 is a cross-sectional schematic view of assembly and engagement of the lateral positioning device according to the fifth preferred embodiment of the present invention.
Figure 25:
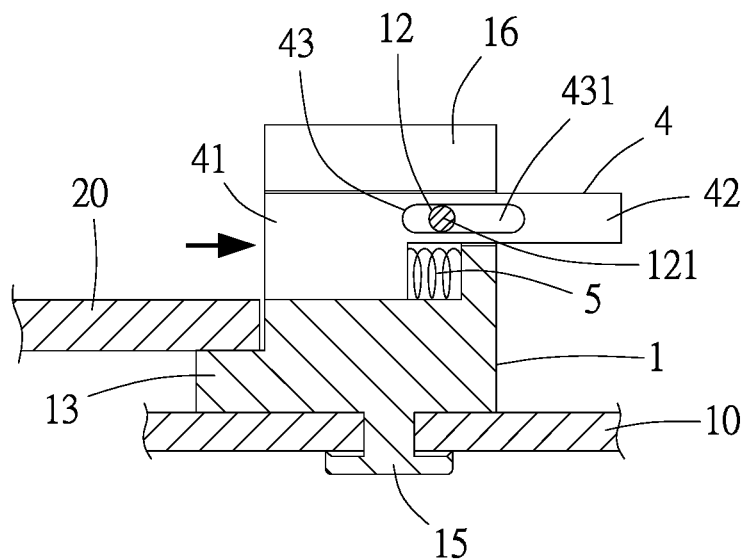
FIG. 25 is a cross-sectional schematic view of assembly and disengagement of the lateral positioning device shown in FIG. 24.
Figure 26:
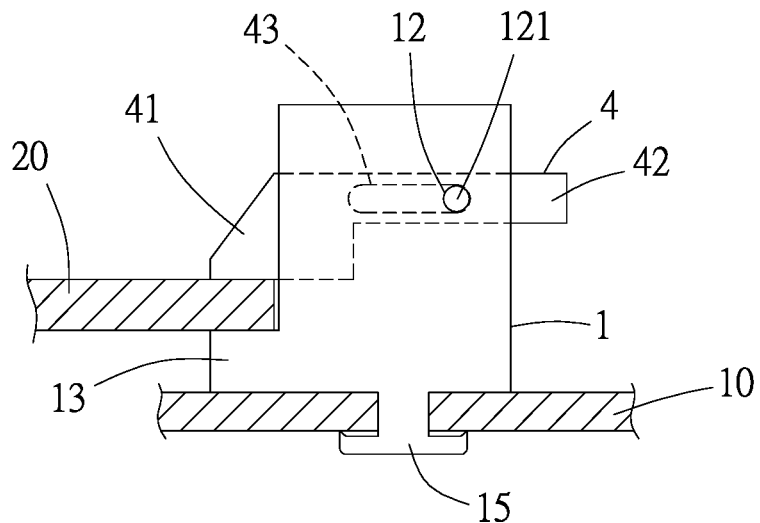
FIG. 26 is a cross-sectional schematic view of assembly and engagement of the lateral positioning device shown in FIG. 24.
Figure 27:
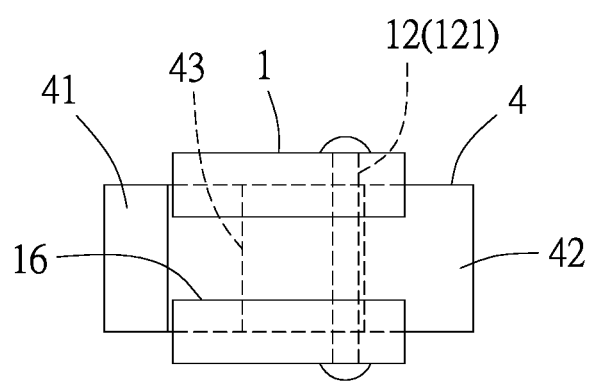
FIG. 27 is a top view of the assembly framework of the lateral positioning device shown in FIG. 24.
Figure 28:
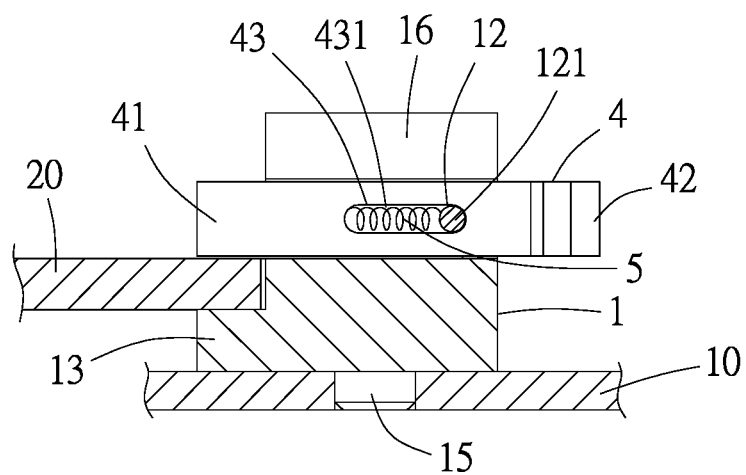
FIG. 28 is a cross-sectional schematic view of a body portion provided in the form of a cylinder according to the fifth preferred embodiment of the present invention.
Figure 29:
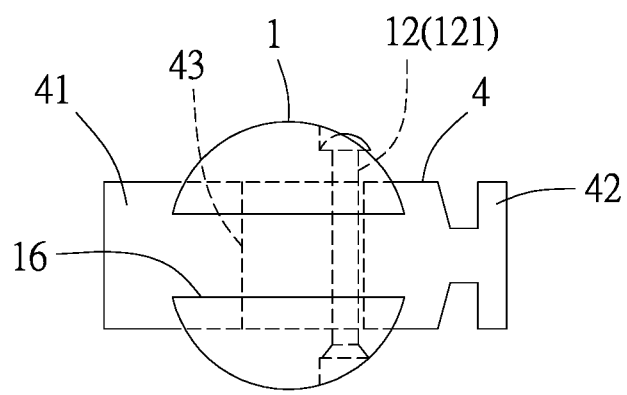
FIG. 29 is a top view of the assembly framework of the body portion shown in FIG. 28.
Figure 44:
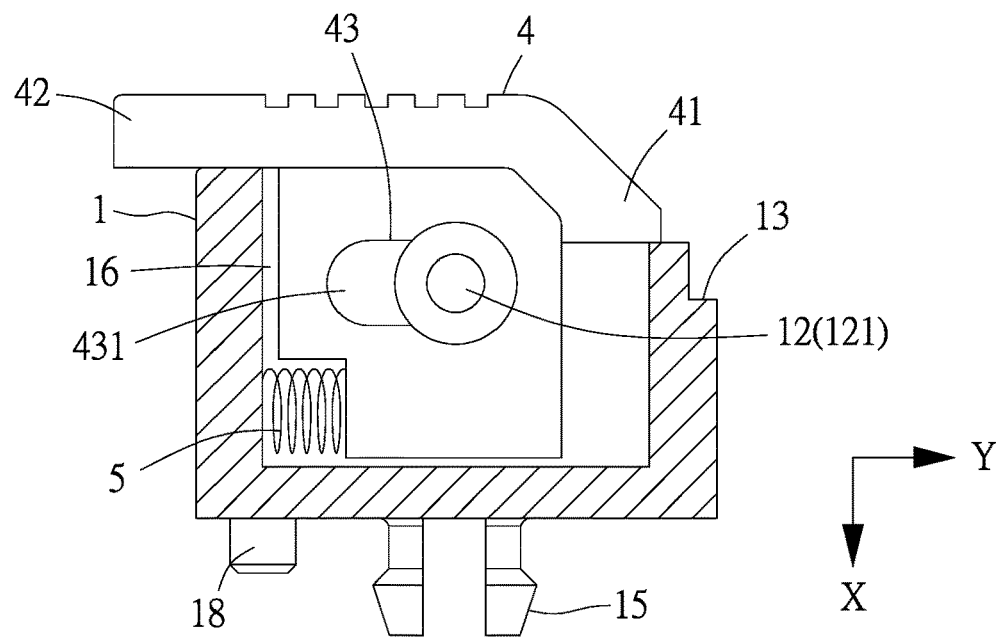
FIG. 44 is a cross-sectional schematic view of the lateral positioning device according to the six preferred embodiment of the present invention.
Figure 45:
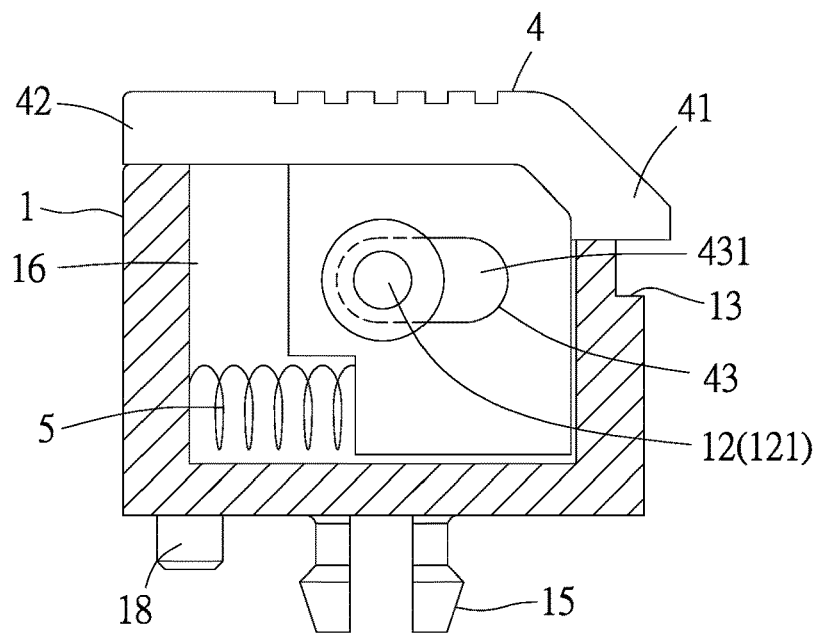
FIG. 45 is a cross-sectional schematic view of assembly and engagement of the lateral positioning device shown in FIG. 44.
Figure 46:
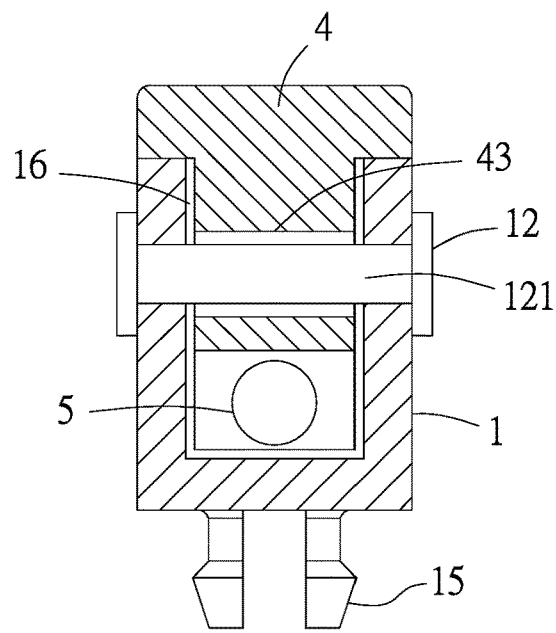
FIG. 46 is a cross-sectional schematic view of assembly of the lateral positioning device shown in FIG. 44 and from another direction.
Figure 48:
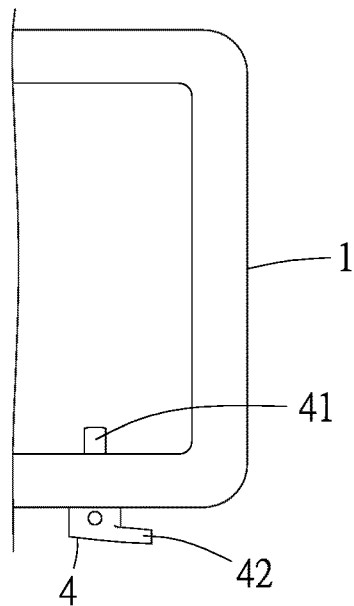
FIG. 48 is a schematic view of the lateral positioning device provided in the form of a handle structure or a latch structure according to the present invention.

Referring to FIG. 24 and FIG. 25, the body portion 1 is a post, a cylinder (shown in FIG. 28 and FIG. 29), a rod, a block (shown in FIG. 44 through FIG. 46), a plate, a hollowed-out structure, a bent structure, a polyhedral structure, an irregularly shaped solid structure, a handle structure (shown in FIG. 48) or a latch structure. The body portion 1 has the shoulder 13 which abuts against the first object 10 or second object 20. The body portion 1 has a jointing portion 15. The jointing portion 15 is adapted to be coupled to the first object 10 in the first direction X through a post-connecting structure (shown in FIG. 28), a riveting structure (shown in FIG. 34 to FIG. 37), a screwing structure (shown in FIG. 30 and FIG. 32), an expanding structure, a welding structure, a snap-engaging structure (shown in FIG. 24, FIG. 25, FIG. 26, FIG. 44 and FIG. 45), an adhering structure, a magnetically attracting structure or an integrally formed structure so that the lateral positioning device of the present invention and the first object 10 together form a module. Referring to FIG. 44 and FIG. 45, the body portion 1 has a positioning portion 18. The positioning portion 18 and the jointing portion 15 are jointly mounted on the first object 10 so as to form a module.

Figure 30:
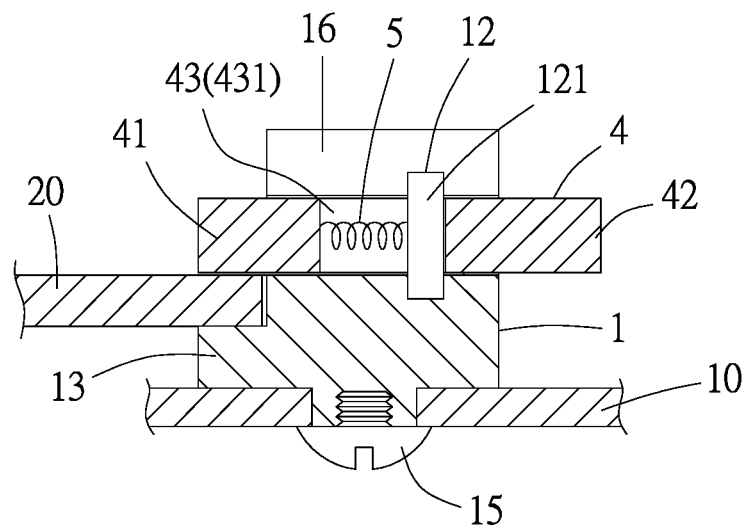
FIG. 30 is a cross-sectional schematic view of a movement opening of a movement element and the limiting portion according to another preferred embodiment of the present invention.
Figure 31:
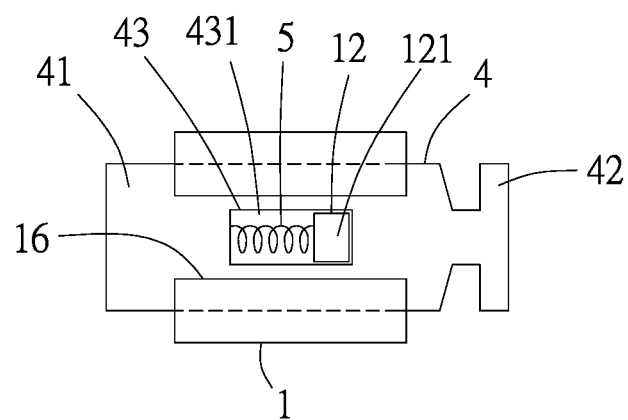
FIG. 31 is a top view of the assembly framework shown in FIG. 30.
Figure 47:
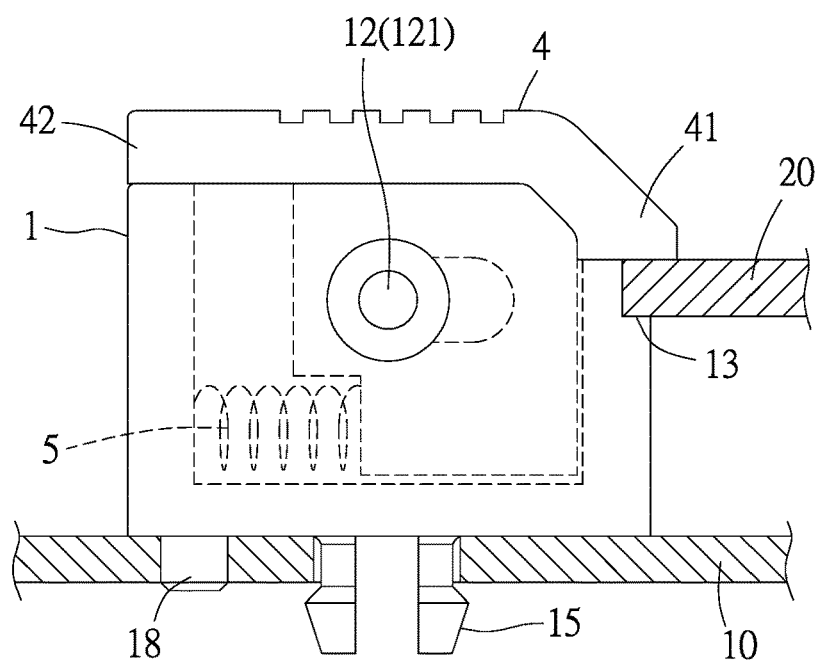
FIG. 47 is a cross-sectional schematic view of the lateral positioning device shown in FIG. 44, applied to a first object, and engaged with the second object.

Referring to FIG. 24, FIG. 28, FIG. 44 and FIG. 45, the movement element 4 has a movement opening 43. The movement opening 43 is a through hole, a recess, an oblong slot or an oblong hole so that the limiting portion 12 is confined to the movement opening 43 of the movement element 4 to allow the movement element 4 to move within a movement limiting space 431 of the movement opening 43, so as to catch or release the second object 20 (such as FIG. 47). The limiting portion 12 is a penetratingly disposing element 121. The penetratingly disposing element 121 is integrally formed of a post (such as FIG. 46), an engaging structure or a plate and the body portion 1 or the movement element 4 so that the penetratingly disposing element 121 movably penetratingly disposed or fixedly penetratingly disposed in the movement opening 43 of the movement element 4. Referring to FIG. 24 through FIG. 29, and FIG. 46, the penetratingly disposing element 121 is coupled to the body portion 1 in a manner to not only allow the penetratingly disposing element 121 to be perpendicular to the axis of the body portion 1 but also allow the penetratingly disposing element 121 to be penetratingly disposed in the movement opening 43. Referring to FIG. 30 and FIG. 31, the penetratingly disposing element 121 is coupled to the body portion 1 in a manner to not only allow the penetratingly disposing element 121 to be parallel to the axis of the body portion 1 but also allow the penetratingly disposing element 121 to be penetratingly disposed in the movement opening 43.

Figure 32:
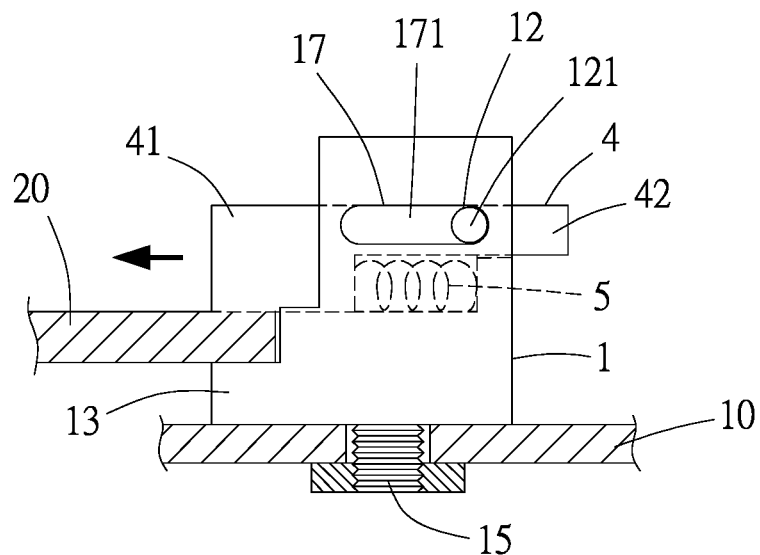
FIG. 32 is a cross-sectional schematic view of a body portion opening of the body portion and the limiting portion according to another preferred embodiment of the present invention.
Figure 33:
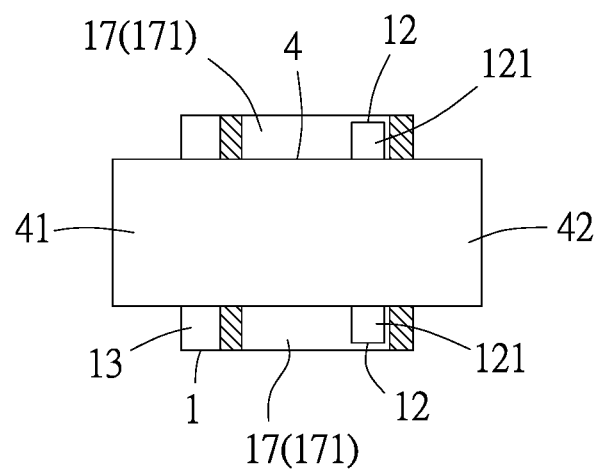
FIG. 33 is a top cross-sectional schematic view of the assembly framework shown in FIG. 32.
Figure 34:
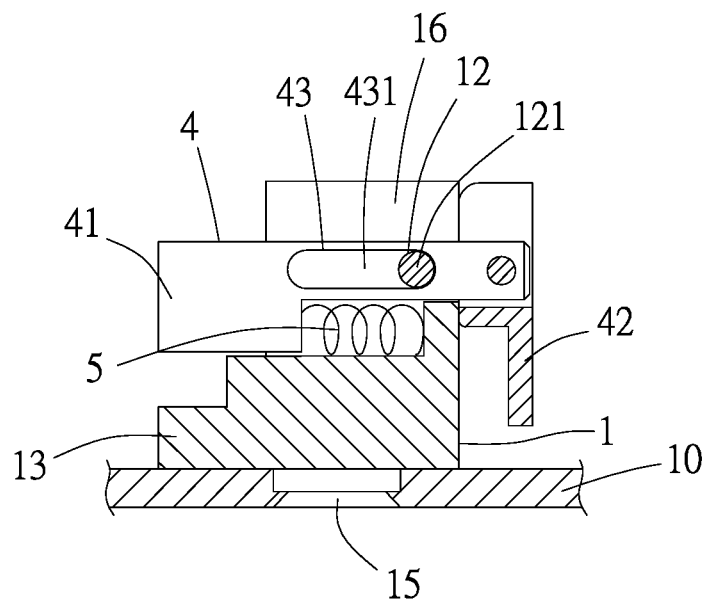
FIG. 34 is a cross-sectional schematic view which shows that an operating portion of the movement element is a movable board.
Figure 35:
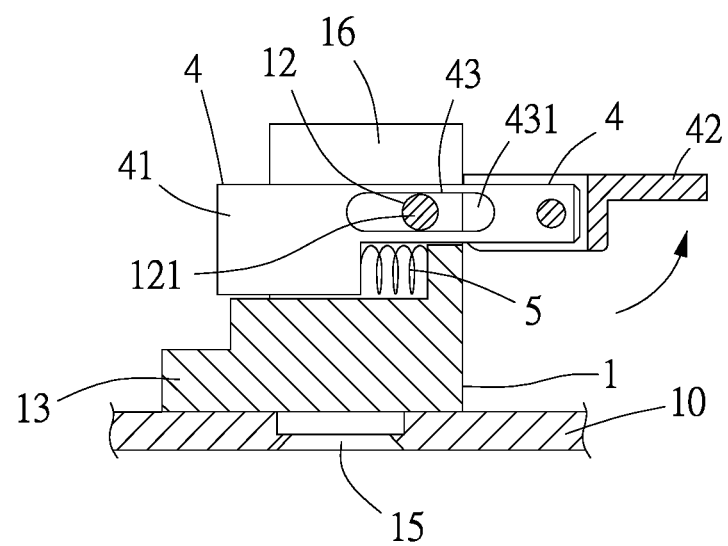
FIG. 35 is a cross-sectional schematic view of the operation of the operating portion shown in FIG. 34.
Figure 36:
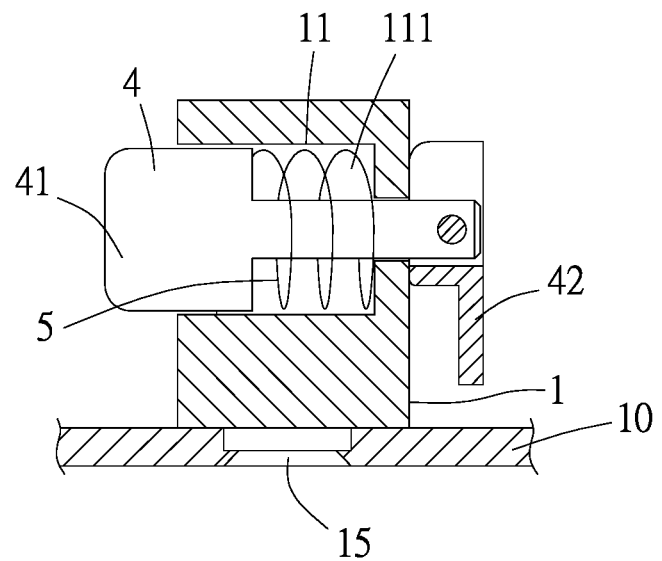
FIG. 36 is a cross-sectional schematic view which shows that an operating portion of the movement element is a movable board.
Figure 37:
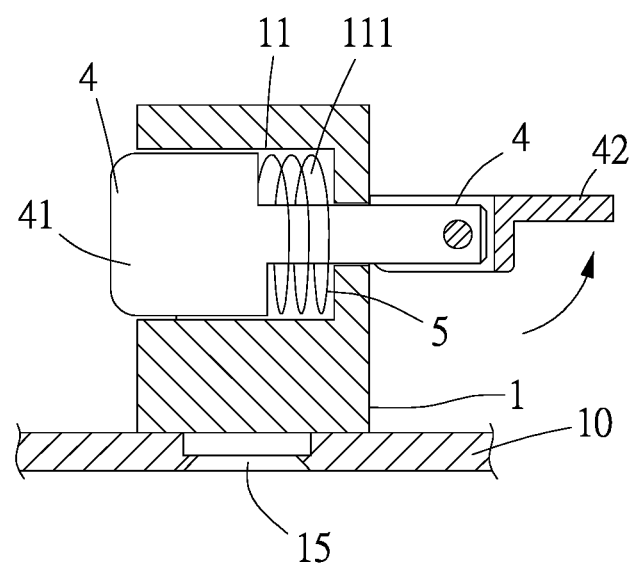
FIG. 37 is a cross-sectional schematic view of the operation of the operating portion shown in FIG. 36.

Referring to FIG. 32 and FIG. 33, in a preferred embodiment of the present invention, the body portion 1 has at least one body portion opening 17. The at least one body portion opening 17 is disposed on two sidewalls of the limiting portion 12, respectively. The body portion opening 17 is a through hole, a recess, an oblong slot or an oblong hole; hence, the limiting portion 12 is confined to the body portion opening 17 of the body portion 1 to allow the movement element 4 to move within a movement limiting space 171 of the body portion opening 17, thereby allowing the engaging portion 41 of the movement element 4 to catch or release the second object 20. Referring to FIG. 32 and FIG. 33, the limiting portion 12 is a penetratingly disposing element 121. The penetratingly disposing element 121 is integrally formed of a post, an engaging structure or a plate and the body portion 1 or the movement element 4 to not only allow the penetratingly disposing element 121 to be coupled to one or two sides of the movement element 4 but also allow the penetratingly disposing element 121 to be penetratingly disposed in the body portion opening 17.

Referring to FIG. 24, FIG. 28, FIG. 30, FIG. 32, FIG. 33, FIG. 44 and FIG. 45, a resilient element 5 is provided in the second preferred embodiment of the present invention. The resilient element 5 is a spring, a leaf spring, a resilient post or a resilient body. The resilient element 5 is abuttingly disposed between the movement element 4 and the limiting portion 12 (shown in FIG. 28) or abuttingly disposed between the movement element 4 and the body portion 1 (shown in FIG. 24) so that the resilience of the resilient element 5 assists the engaging portion 41 of the movement element 4 in catching or releasing the second object 20.

Figure 41:
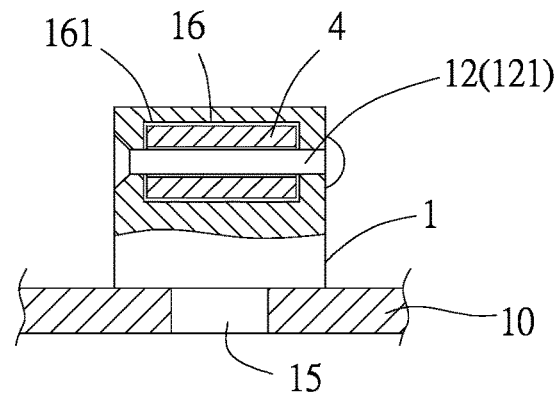
FIG. 41 is a cross-sectional schematic view which shows that a chamber portion of the body portion is a penetrating opening.
Figure 42:
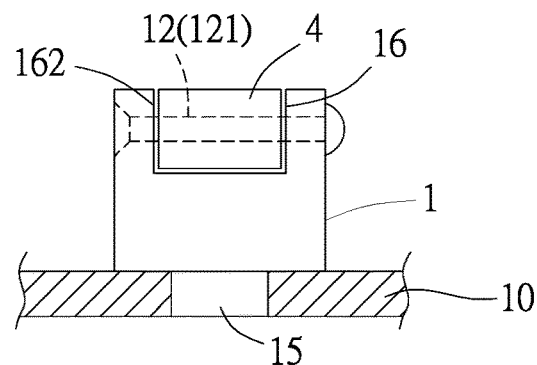
FIG. 42 is a cross-sectional schematic view which shows that the chamber portion of the body portion is a recess.
Figure 43:
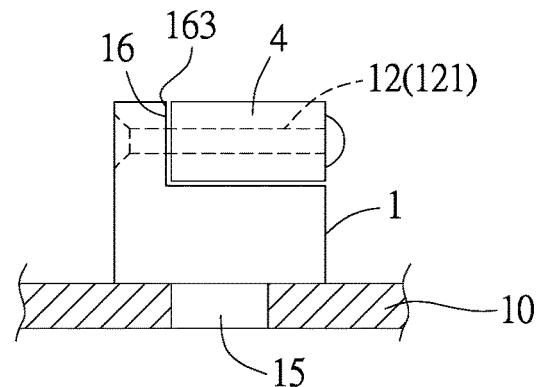
FIG. 43 is a cross-sectional schematic view which shows that the chamber portion of the body portion is an L-shaped chamber or a one-sided chamber.

Referring to FIG. 41, according to the present invention, the chamber portion 16 of the body portion 1 penetrates a through hole or a penetrating opening of the body portion 1 to allow the movement element 4 to be penetratingly disposed in the through hole or a penetrating opening 161. Referring to FIG. 42, FIG. 44 through FIG. 46, the chamber portion 16 of the body portion 1 bulges inward into a recess 162 at one end or on one side of the body portion 1 to allow the movement element 4 to be penetratingly disposed in the recess 162. Referring to FIG. 43, the chamber portion 16 of the body portion 1 bulges inward into an L-shaped chamber 163 or a one-sided chamber on one side of the body portion 1 to allow the movement element 4 to be penetratingly disposed in the L-shaped chamber 163 or the one-sided chamber.

Figure 49:
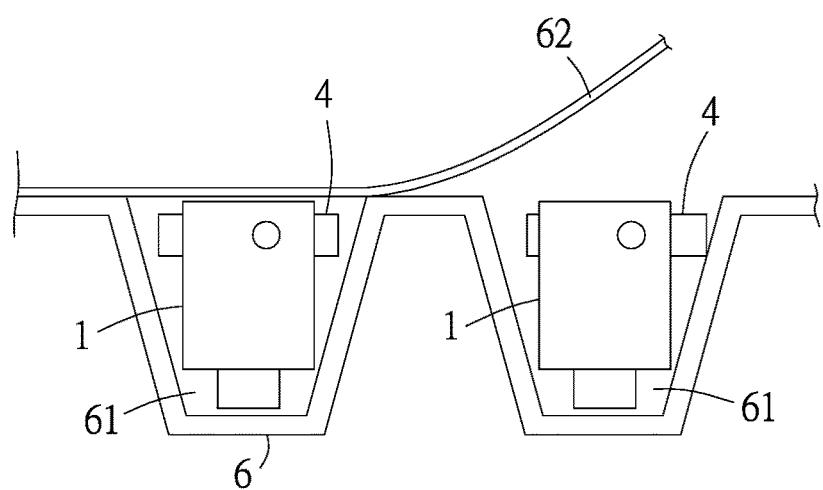
FIG. 49 is a schematic view of the lateral positioning device loaded with a carrier according to an embodiment of the present invention.

Referring to FIG. 49, a carrier 6 is further provided in a preferred embodiment of the present invention. The carrier 6 carries the lateral positioning device. The carrier 6 is provided in the form of a feed pan or a feed belt and has at least one receiving portion 61. The lateral positioning device is received in the receiving portion 61. The carrier 6 has a lid 62 for covering the receiving portion 61 and the lateral positioning device to prevent the lateral positioning device from falling off the carrier 6.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A lateral positioning device, comprising:
   a body portion having a jointing portion being coupled to a first object in a first direction and having a through hole which has therein a limiting portion and extends in a second direction, with an angle formed between the first direction and the second direction, the first object is a circuit board; and
   a positioning element penetratingly disposed in the through hole and limited by the limiting portion to thereby move in the second direction, wherein the positioning element has an engaging portion for engaging or interfering with a corresponding object;
   wherein two limiting portions are disposed on an inner wall of the through hole or disposed at openings at two ends of the through hole, respectively, and a stopping portion of the positioning element is received in the through hole between the limiting portions.

2. The lateral positioning device of claim 1, wherein the body portion has a shoulder for abutting against the first object.

3. The lateral positioning device of claim 1, further comprising a resilient element with an end abutting against the body portion or any one of the limiting portions and another end abutting against the stopping portion.

4. The lateral positioning device of claim 1, wherein the positioning element has at an end thereof an operating portion with a color layer, and the color layer is made of one of plastic, rubber, silica gel, lacquer, baking varnish and electroplated layer.

* * * * *